(12) United States Patent
Ohara

(10) Patent No.: US 9,420,139 B2
(45) Date of Patent: Aug. 16, 2016

(54) EQUIPMENT UNIT, INFORMATION PROCESSING SYSTEM, INFORMATION PROCESSING METHOD, AND PROGRAM

(71) Applicant: Kazuki Ohara, Kanagawa (JP)

(72) Inventor: Kazuki Ohara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/623,225

(22) Filed: Feb. 16, 2015

(65) Prior Publication Data

US 2015/0237229 A1    Aug. 20, 2015

(30) Foreign Application Priority Data

Feb. 17, 2014  (JP) ................... 2014-027112

(51) Int. Cl.
*H04N 1/00*  (2006.01)
*G06Q 30/02*  (2012.01)

(52) U.S. Cl.
CPC ....... *H04N 1/00925* (2013.01); *G06Q 30/0283* (2013.01); *H04N 1/00034* (2013.01); *H04N 1/00061* (2013.01); *H04N 1/00068* (2013.01); *H04N 1/00082* (2013.01); *H04N 1/00204* (2013.01); *H04N 1/00832* (2013.01); *H04N 1/00877* (2013.01); *H04N 2201/0094* (2013.01)

(58) Field of Classification Search
USPC ....................................................... 358/1.15
See application file for complete search history.

(56) References Cited

U.S. PATENT DOCUMENTS

| 7,880,923 | B2 * | 2/2011 | Kato | ...... G03G 21/02 358/1.13 |
| 2004/0117784 | A1 * | 6/2004 | Endoh | ...... G06F 21/10 717/169 |
| 2006/0026105 | A1 * | 2/2006 | Endoh | ...... G06F 21/10 705/59 |
| 2008/0094657 | A1 * | 4/2008 | Ikegami | ...... G06F 21/608 358/1.15 |
| 2009/0303525 | A1 * | 12/2009 | Yoshida | ...... G03G 15/5087 358/1.15 |

FOREIGN PATENT DOCUMENTS

| JP | H11-224135 | 8/1999 |
| JP | 2000-020260 | 1/2000 |
| JP | 4227635 | 2/2009 |
| JP | 2011-150531 | 8/2011 |

* cited by examiner

*Primary Examiner* — Ngon Nguyen
(74) *Attorney, Agent, or Firm* — Harness, Dickey & Pierce, P.L.C.

(57) ABSTRACT

An equipment unit is disclosed, including a first obtaining unit which obtains first identification information for a parameter set for calculating a use amount of the equipment unit; a comparison unit which compares the first identification information and second identification information for a parameter set for calculating a use amount of the equipment unit; a second obtaining unit which obtains information on a difference between the parameter set related to the first identification information and the parameter set stored in the equipment unit when the first identification information and the second identification information differ; and a control unit which calculates an amount of use of the equipment unit based on the parameter set stored in the equipment unit, and the information on the difference and controls the use of the equipment unit by the user.

20 Claims, 11 Drawing Sheets

FIG.6

| USER ID | USER NAME | USE TABLE TYPE |
|---|---|---|
| 1 | alice | A |
| 2 | bob | B |
| 3 | charly | B |
| 4 | dave | A |

| USER ID | CURRENT VALUE | UPPER LIMIT VALUE |
|---|---|---|
| 1 | 1980 | 2000 |
| 2 | 2000 | 3000 |
| 3 | 200 | 3000 |
| 4 | 0 | 2000 |

FIG.8

| ID:A10 | | FUNCTION | |
| --- | --- | --- | --- |
| | | Copy(c) | Print(p) |
| ATTRIBUTE | BLACK AND WHITE(bw) | 10 | 15 |
| | COLOR(fc) | 17 | 20 |
| | A4(a4) | 5 | 5 |
| | A3(a3) | 15 | 10 |
| | Other(ot) | 13 | 12 |

| ID:A11 | | FUNCTION | |
| --- | --- | --- | --- |
| | | Copy(c) | Print(p) |
| ATTRIBUTE | BLACK AND WHITE(bw) | 10 | 15 |
| | COLOR(fc) | 15 | 20 |
| | A4(a4) | 5 | 5 |
| | A3(a3) | 11 | 10 |
| | Other(ot) | 13 | 12 |

| ID:B5 | | FUNCTION | |
| --- | --- | --- | --- |
| | | Copy(c) | Print(p) |
| ATTRIBUTE | BLACK AND WHITE(bw) | 10 | 0 |
| | COLOR(fc) | 15 | 0 |
| | A4(a4) | 6 | 0 |
| | A3(a3) | 11 | 0 |
| | Other(ot) | 13 | 5 |

FIG.9

| USER ID | CURRENT VALUE | UPPER LIMIT VALUE |
|---|---|---|
| 1 | 1980 | 2000 |

FIG.10

| LOG ID | USER ID | COLOR ATTRIBUTE | SIZE ATTRIBUTE | THE NUMBER OF FACES | THE NUMBER OF SHEETS PRINTED |
|---|---|---|---|---|---|
| 1 | 1 | BLACK AND WHITE | A4 | 2 | 1 |
| 2 | 1 | BLACK AND WHITE | A3 | 1 | 1 |
| 3 | 2 | COLOR | Other | 4 | 2 |
| 4 | 1 | BLACK AND WHITE | A4 | 2 | 2 |

FIG.12

| USER ID | USE TABLE ID |
|---|---|
| 1 | A10 |
| 2 | ... |
| 3 | ... |
| 4 | ... |

134

EQUIPMENT UNIT, INFORMATION PROCESSING SYSTEM, INFORMATION PROCESSING METHOD, AND PROGRAM

TECHNICAL FIELD

The present invention relates to equipment units, information processing systems, information processing methods, and programs.

BACKGROUND ART

An upper limit management function is used in image forming apparatuses. The upper limit management function is a function such that execution of printing is permitted for the respective users within a range of an upper limit value for the respective users. Examples of the image forming apparatuses which include the upper limit management function include an image forming apparatus connected to a coin rack which is installed in a supermarket, a convenience store, etc. In such an image forming apparatus, execution of printing is restricted to within a range of an amount dropped into the coin rack (below-called "a charging apparatus").

PATENT DOCUMENT

Patent Document 1: JP2011-150531A

In the above-described example, one charging apparatus is connected to one image forming apparatus. Therefore, the charging apparatus may instantaneously detect that use of the image forming apparatus by a user has reached an upper limit to restrict the use of the image forming apparatus.

However, in a system for a large company, for example, one charging apparatus may be connected via a network to multiple image forming apparatuses. In this case, one charging apparatus may determine a cost of the print job for the respective multiple image forming apparatuses which are used in parallel to perform upper limit management. As a result, load is concentrated at the charging apparatus and the image forming apparatus places on hold a response to an inquiry on whether printing is possible, causing a likelihood of an increased time required for printing (in other words, causing a likelihood in lowered ease of use of the image forming apparatus.) Moreover, making an inquiry to the charging apparatus and printing by the image forming apparatus non-synchronous in order to avoid an increase in time required for printing could cause printing to be executed beyond the restriction to the user before the response to the inquiry is returned.

Thus, it is possible to make the respective image forming apparatuses calculate the cost and compare the cumulative value and the upper limit value of the cost. In this way, load on the charging apparatus may be lowered and instantaneity of the use restriction may be improved.

In this case, a set of parameters for calculating the cost needs to be distributed to the respective image forming apparatuses. The set of parameters, which is not necessarily stable, could be updated due to a change in price of a sheet or a toner. Therefore, it is desirable for the set of parameters to be able to be easily distributed to the respective image forming apparatuses via a network.

However, distributing the set of parameters every time updating is made could cause the communications load for distributing the set of parameters to increase.

DISCLOSURE OF THE INVENTION

In light of the problems described above, an object of the present invention is to suppress an increased amount of communications load for distributing, to an equipment unit, a set of parameters for calculating an equipment use cost.

According to an embodiment of the present invention, an equipment unit is provided, including a first obtaining unit which obtains, via a network, first identification information for a parameter set for calculating a use amount of the equipment unit; a comparison unit which compares the first identification information obtained by the first obtaining unit and second identification information for a parameter set for calculating a use amount of the equipment unit that is stored in the equipment unit; a second obtaining unit which obtains, via the network, information on a difference between the parameter set related to the first identification information and the parameter set stored in the equipment unit when the first identification information and the second identification information differ; and a control unit which calculates an amount of use of the equipment unit by a user which operates the equipment unit based on the parameter set stored in the equipment unit, and the information on the difference that is obtained by the second obtaining unit and controls the use of the equipment unit by the user in accordance with the calculated amount of use.

The embodiment of the present invention makes it possible to suppress an increased amount of communications load for distributing, to an equipment unit, a set of parameters for calculating an equipment use cost.

BRIEF DESCRIPTION OF THE DRAWINGS

Other objects, features, and advantages of the present invention will become more apparent from the following detailed descriptions when read in conjunction with the accompanying drawings, in which:

FIG. 6 is a diagram illustrating an exemplary configuration of a user information storage unit;

FIG. 7 is a diagram illustrating an exemplary configuration of an upper limit management table stored in an upper limit information storage unit;

FIG. 8 is a diagram illustrating an exemplary pricing table stored in the upper limit information storage unit;

FIG. 9 is a diagram illustrating an exemplary configuration of an intra-machine upper limit management table stored in an intra-machine upper limit information storage unit;

FIG. 10 is a diagram illustrating an exemplary configuration of a log storage unit;

FIG. 12 is a diagram illustrating an exemplary configuration of an intra-machine user storage unit.

BEST MODE FOR CARRYING OUT THE INVENTION

Figure 1:
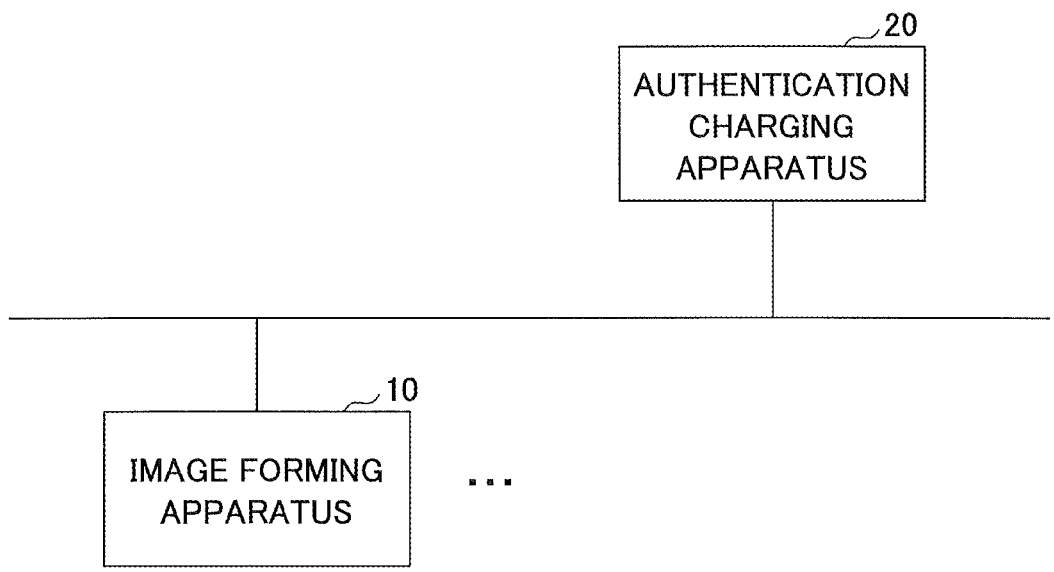
FIG. 1 is a diagram illustrating an exemplary configuration of a printing system according to an embodiment of the present invention.

Below, an embodiment of the present invention is explained based on the drawings. FIG. 1 is a diagram illustrating an exemplary configuration of a printing system according to an embodiment of the present invention. In a printing system 1 shown in FIG. 1, at least one image forming apparatus 10 and an authentication charging apparatus 20 are communicatively connected via a network such as a LAN (local area network), the Internet, etc.

The image forming apparatus 10 is an equipment unit which has a function of printing print data which are registered in advance by a logged-in user. The image forming apparatus 10 also includes a function (below-called "upper-limit management function" of restricting use of the image forming apparatus 10 by the user to within a range of an upper limit value set in advance.

The authentication charging apparatus 20 is a computer which manages information for authenticating the respective users with a privilege to use the image forming apparatus 10; information necessary for realizing the upper limit management function for the respective users.

Figure 2:
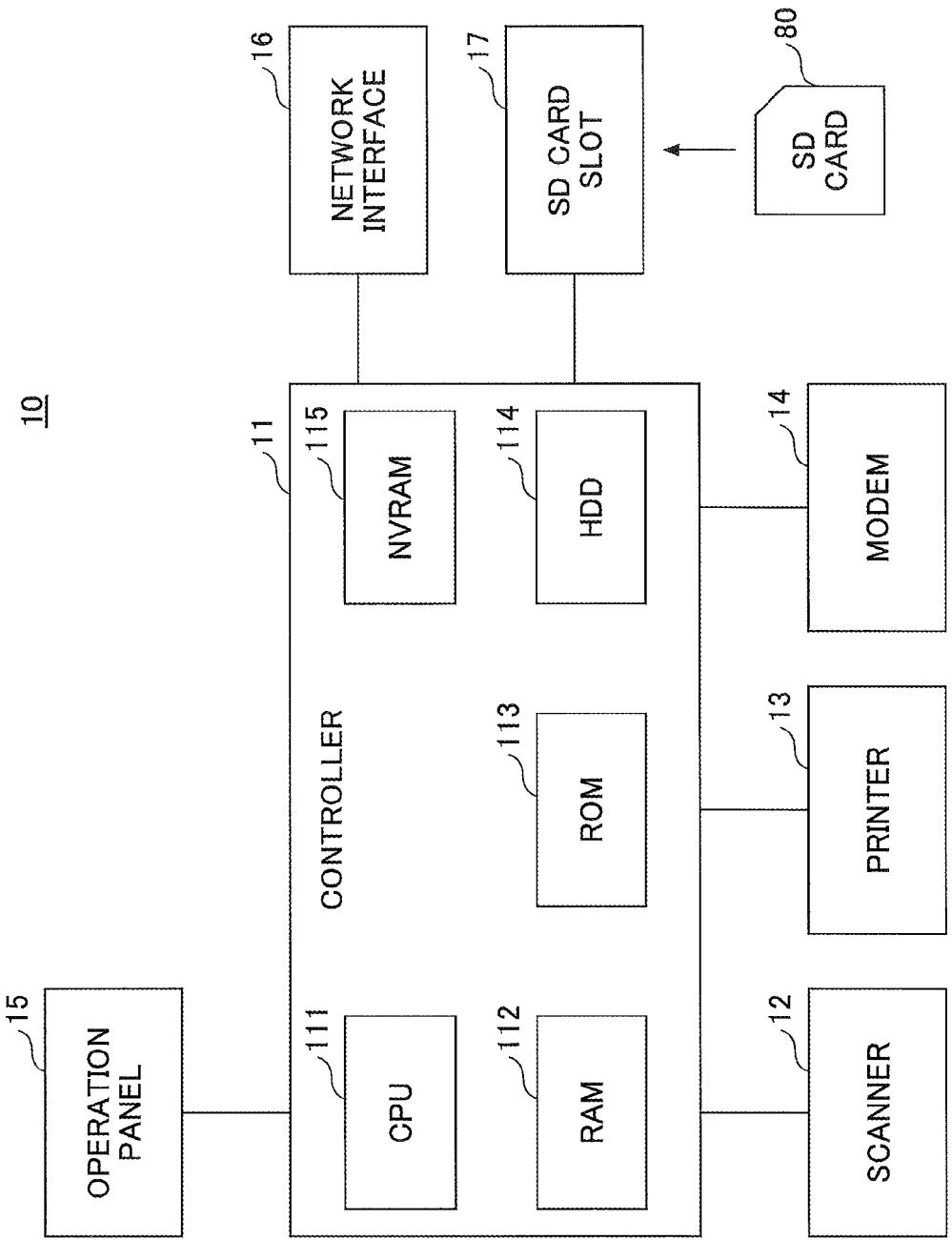
FIG. 2 is a diagram illustrating an exemplary hardware configuration of an image forming apparatus according to the embodiment of the present invention.

FIG. 2 is a diagram illustrating an exemplary hardware configuration of an image forming apparatus according to the embodiment of the present invention. In FIG. 2, the image forming apparatus 10 includes hardware units such as a controller 11, a scanner 12, a printer 13, a modem 14, an operation panel 15, a network interface 16, an SD card slot 17, etc.

The controller 11 includes a CPU 111, a RAM 112, a ROM 113, an HDD 114, an NVRAM 115, etc. In the ROM 113 are stored various programs and data, etc., used by the programs. The RAM 112 is used as a storage area for loading the programs, a work area for the loaded programs, etc. The CPU 111 processes the programs loaded into the RAM 112 to realize various functions. In the HDD 114 are stored programs, various data sets used by the programs, etc. In the NVRAM 115 is stored various setting information sets, etc.

The scanner 12 is a hardware unit (an image reading unit) for reading image data from a manuscript. The printer 13 is a hardware unit (a printing unit) for printing print data onto a printing sheet. The modem 14, which is a hardware unit for connecting to telephone lines, is used to execute transmission and reception of image data via facsimile communications. The operation panel 15 is a hardware unit which includes an input unit such as a button, etc., that is for accepting an input from a user and which includes a liquid crystal panel, etc. The liquid crystal panel may include a touch panel function. In this case, the liquid display panel also serves a function of an input unit. The network interface 16 may be a hardware unit for connecting to the network (regardless of wired or wireless), such as the LAN, etc. The SD card slot 17 is used for reading programs stored in an SD card 80. In other words, in the image forming apparatus 10, not only the programs stored in the ROM 113, but also the programs stored in the SD card 80 may be loaded and executed. The SD card 80 may be replaced by a different recording medium (a CD-ROM, a USB (Universal Serial Bus) memory, etc., for example). In other words, the type of the recording medium that corresponds to the positioning of the SD card 80 is not limited to a predetermined one. In this case, the SD card slot 17 may be replaced by a hardware unit in accordance with the type of the recording medium.

According to the present embodiment, the image forming apparatus 10 does not have to include the scanner 12 or the modem 14.

Figure 3:
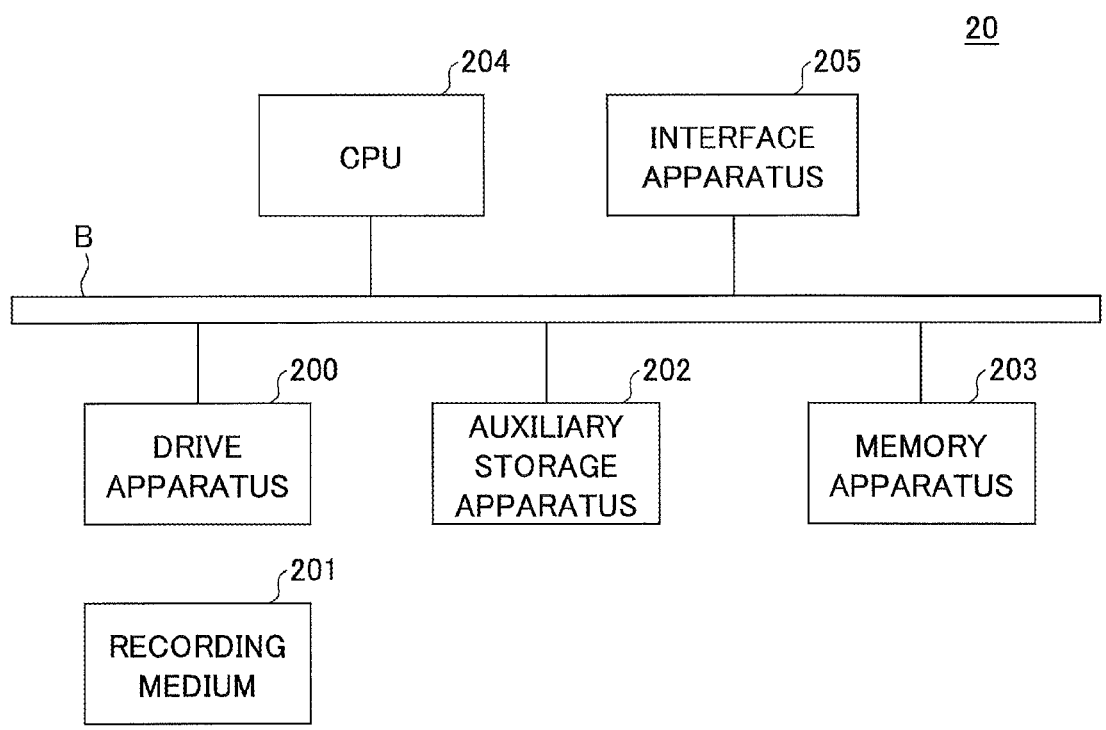
FIG. 3 is a diagram illustrating an exemplary hardware configuration of an authentication charging apparatus according to the embodiment of the present invention.

FIG. 3 is a diagram illustrating an exemplary hardware configuration of an authentication charging apparatus according to the embodiment of the present invention. An authentication charging apparatus 20 in FIG. 3 includes a drive apparatus 200, an auxiliary storage apparatus 202, a memory apparatus 203, a CPU 204, an interface apparatus 205, etc.

Programs for realizing the process in the authentication charging apparatus 20 are provided by the recording medium 201 such as a CD-ROM, etc. When the recording medium 201 which has stored thereon the programs are set in the drive apparatus 200, the programs are installed into the auxiliary storage apparatus 202 via the drive apparatus 200 from the recording medium 201. The installation of the programs, which does not have to be performed from the recording medium 201, may be downloaded from a different computer via the network. The auxiliary storage unit 202 stores thereon the installed program as well as necessary files, data, etc.

If there is an instruction for launching the programs, the memory apparatus 203 reads the programs from the auxiliary storage apparatus 202 to store therein the read results. The CPU 204 executes functions related to the authentication charging apparatus 20 in accordance with the programs stored in the memory apparatus 203. The interface apparatus 205 is used as an interface for connecting to the network.

The authentication charging apparatus 20 does not have to be one computer unit. In other words, the authentication charging apparatus 20 may be a computer system including the computer shown in FIG. 3 in a multiple number.

Figure 4:
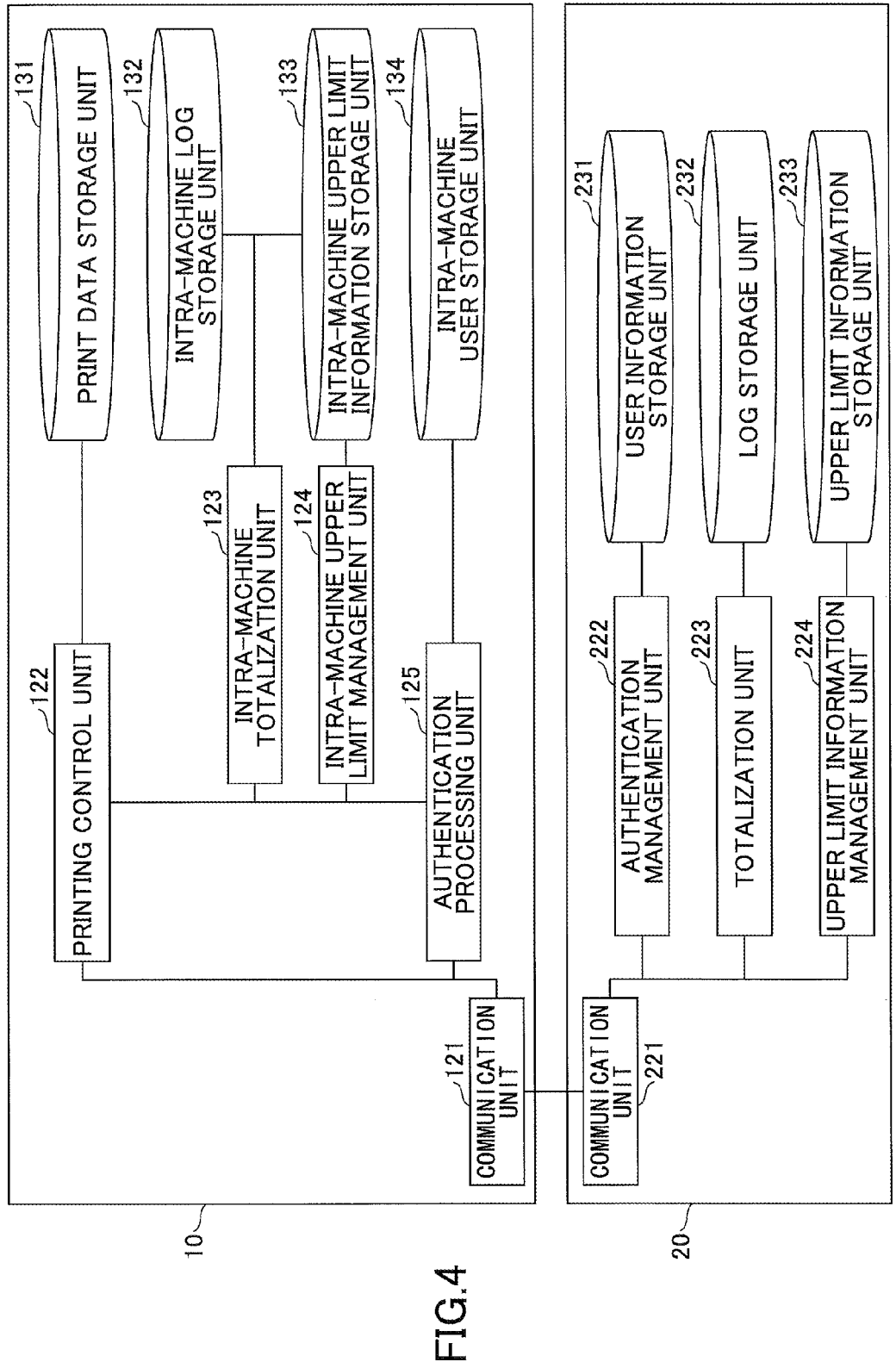
FIG. 4 is a diagram illustrating an exemplary functional configuration of the printing system according to the embodiment of the present invention.

FIG. 4 is a diagram illustrating an exemplary functional configuration of a printing system according to an embodiment of the present invention. In FIG. 4, the image forming apparatus 10 includes a communication unit 121, a printing control unit 122, an intra-machine totalization unit 123, an intra-machine upper limit management unit 124, an authentication processing unit 125, etc. These respective units are realized by a process which one or more programs installed in the image forming apparatus 10 causes the CPU 111 to execute. The image forming apparatus 10 also uses a print data storage unit 131, an intra-machine log storage unit 132, an intra-machine upper limit information storage unit 133, an intra-machine user storage unit 134, etc. These respective storage units can be realized using the HDD 114 or the NVRAM 115, or a storage apparatus. etc., connected via a network to the image forming apparatus 10.

The communication unit 121 controls communication with a communication unit 221 of the authentication charging apparatus 20 to intermediate obtaining user information, or information necessary for the upper limit management function. The printing control unit 122 executes a print job for a print data set selected by the user from print data sets stored in the print data storage unit 131. In other words, in the print data storage unit 131 are stored print data in association with user identification information (below called "a user ID"). The print data stored in the print data storage unit 131 may be transmitted from a PC (personal computer), a smartphone, a tablet-type terminal, a mobile telephone, etc., that are not shown, or it may be read from a manuscript with the scanner 12. The printing control unit 122 also reports a printing execution event to the intra-machine totalization unit 123 and the intra-machine upper limit management unit 124 every time printing corresponding to one face is executed in the process of executing the print job.

Based on the printing execution event from the printing control unit 122, the intra-machine totalization unit 123 totalizes a use amount (below called "cost") of the image forming apparatus 10 by the user and generates log information. The intra-machine upper limit management unit 124 determines whether a restriction to the user is necessary based on the upper limit value for the user and a cumulative value (below-called "a current value") of the cost up to the current timing of the user related to the print job based on the cost totalized by the intra-machine totalization unit 123. If it is determined that the restriction is necessary, the upper limit information management unit 224 stops execution of the print job by the printing control unit 122. The authentication processing unit 125 makes an inquiry on user information to the authentication charging apparatus 20 via the communication unit 121 and determines whether the user has a privilege to use the image forming apparatus 10.

The intra-machine user storage unit 134 stores information on the user which was determined to have the privilege to use the image forming apparatus 10 by the authentication processing unit 125. The intra-machine log storage unit 132 stores log information generated by the intra-machine totalization unit 123. The intra-machine upper limit information storage unit 133 stores a pricing table obtained from the authentication charging apparatus 20. The pricing table is a table in which are registered parameters for calculating the cost based on modes of executing the print job, such as print job setting information.

The authentication charging apparatus 20 includes a communication unit 221, an authentication management unit 222, a totalization unit 223, an upper limit information management unit 224, etc. These respective units are realized by a process which one or more programs installed in the authentication charging apparatus 20 causes the CPU 204 to execute. The authentication charging apparatus 20 also uses a user information storage unit 231, a log storage unit 232, and an upper limit information storage unit 233, etc. These respective storage units can be realized using an auxiliary storage apparatus 202, or a storage apparatus. etc., connected via a network to the authentication charging apparatus 20.

The communication unit 221 controls communication with the communication unit 121 of the image forming apparatus 10 to transmit, to the image forming apparatus 10, information requested from the image forming apparatus 10. According to a user information obtaining request received by the communication unit 221, user information related to the user ID included in the obtaining request is searched in the user information storage unit 231. When applicable user information is found, the authentication management unit 222 returns the user information via the communication unit 221.

The totalization unit 223 stores log information received by the communication unit 221 into the log storage unit 232. The totalization unit 223 also reports results of totalization of the log information to the upper limit information management unit 224. In response to the pricing table obtaining request received by the communication unit 221, the upper limit information management unit 224 returns a pricing table specified in the obtaining request, out of one or more pricing tables stored in the upper limit information storage unit 233. Moreover, based on the totalization results reported from the totalization unit 223, a current value of the user related to the totalization results, out of current values for the respective users that are stored in the upper limit information storage unit 233, is updated.

For the respective users, the upper limit information storage unit 233 stores a current value and an upper limit value for the cumulative cost value. In other words, the respective users are permitted to use the image forming apparatus 10 when the cumulative value of the cost is within the range of the upper limit value. The user information storage unit 231 stores user information of the respective users. The user information includes a user ID, pricing table identification information which is applied to the applicable user ID, etc. The log storage unit 232 stores log information transmitted from the image forming apparatus 10.

Figure 5:
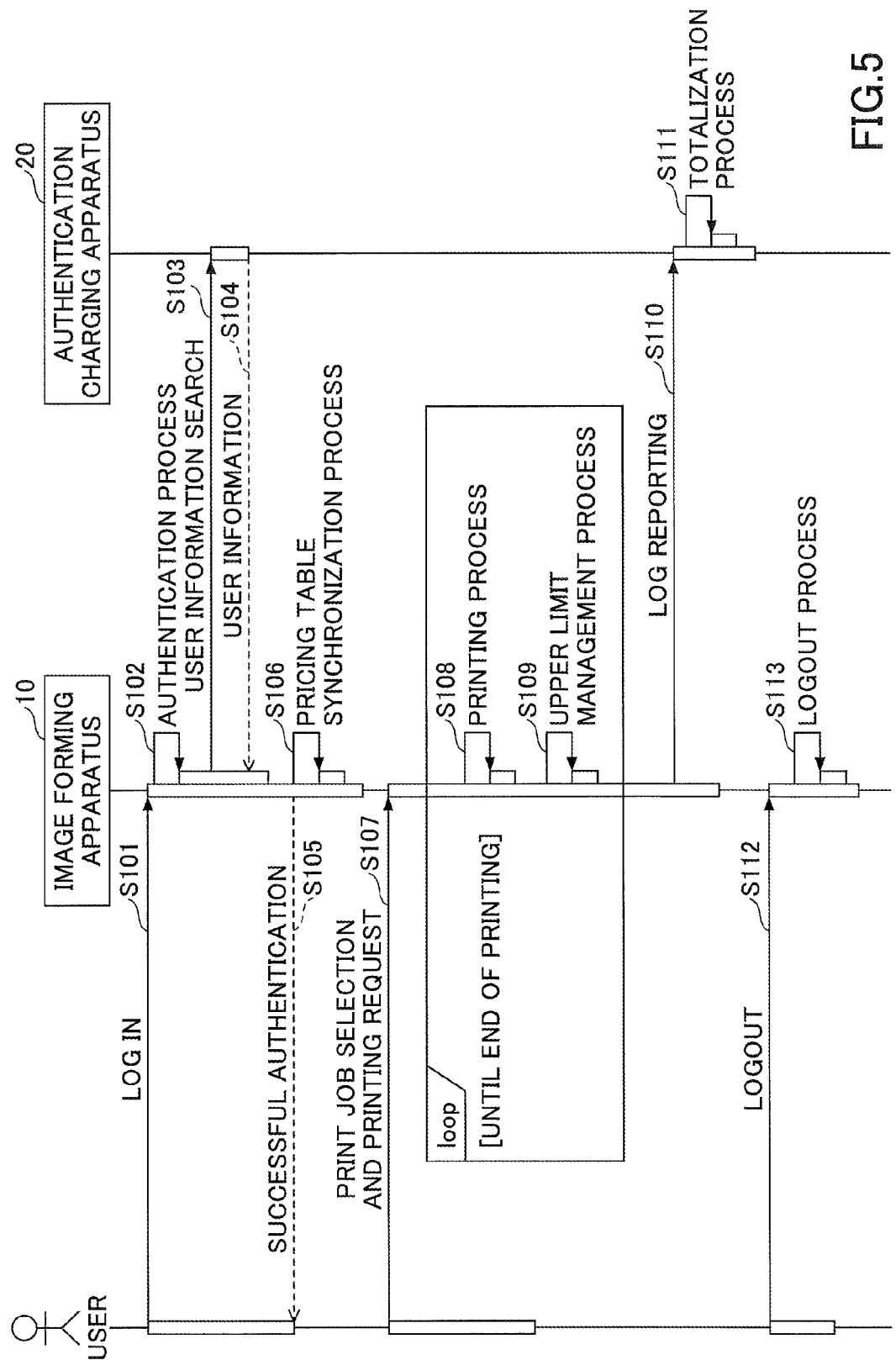
FIG. 5 is a sequence diagram for explaining one example of a processing procedure of a printing process.

Below, a processing procedure executed in the printing system 1 is described. FIG. 5 is a sequence diagram for explaining one example of a processing procedure of a printing process.

In step S101, the authentication processing unit 125 of the image forming apparatus 10 accepts a login request input from a user. Inputting of the login request is performed by setting a card on a card reader (not shown), inputting a user ID, etc., on a login screen displayed on the operation panel 15, for example.

In response to the inputting of the login request, the authentication processing unit starts an authentication process (S102). In the authentication process, the authentication processing unit 125 transmits, to the authentication charging apparatus 20 via the communication unit 121, a request for searching user information including the user ID input with the login request (S103).

When the request for searching the user information is received by the communication unit 221, the authentication management unit 222 searches in the user information storage unit 231 for user information for the user ID included in the searching request.

FIG. 6 is a diagram illustrating an exemplary configuration of a user information storage unit. In FIG. 6, the user information storage unit 231 stores user information for each user having a privilege to use the image forming apparatus 10. The user information includes a user ID, a user name, a use table type, etc. The user ID is identification information for the respective users. The user name is a name of the user. The use table type is type information for each type of a pricing table to be applied to the applicable user. For example, the pricing table may be defined for each department. In this case, the type of pricing table differs from department to department.

If the user information which includes the user IS included in the searching request is found, the authentication management unit 222 obtains the upper limit value and the current value for the applicable user ID from the upper limit management table of the upper limit storage unit 233 via the upper limit information management unit 224.

FIG. 7 is a diagram illustrating an exemplary configuration of an upper limit management table stored in the upper limit information storage unit. In FIG. 7, the upper limit management table associates, with a user ID, a current value and an upper limit value of the user that are related to the applicable user ID to store the associated results. The current value is a cumulative value of the cost up to the current timing. The upper limit value is a value showing an upper limit for the cumulative value of the cost. The current value may be initialized to 0 periodically (for example, every month, etc.). In this case, the upper limit value is an upper limit value for use for each specified period.

Moreover, if user information including the user ID included in the searching request is found, the authentication management unit 222 specifies the latest version within the pricing table related to the use table type corresponding to the applicable user ID, which is stored in the upper limit information storage unit 233.

FIG. 8 is a diagram illustrating an exemplary pricing table stored in the upper limit information storage unit. In FIG. 8, the respective pricing tables include an ID and stores therein a cost for the respective attributes (black and white, color, A4, A3, Other) of the respective functions (copy, print). For example, in the pricing table whose ID is "A10", the cost of Print in black and white is shown as "15". The cost on other functions such as Scan, Fax, etc., may also be registered. Moreover, for the attributes, the cost for other attributes such as A2, 125 mm width roll paper, monochrome, etc., may be registered.

Here, the ID of the pricing table includes a version number following the type of the pricing table. For example, "A10" indicates a pricing table with the type of "A" and the version number of "11". Moreover, according to the present embodiment, whenever the pricing table is updated, 1 is added to the version number. Therefore, when the use table type included in the user information obtained is "A", for example, according to the example in FIG. 8, "A1" is specified as the latest version of the ID. While it is described in the present embodiment that the latest version is valid for all of the users, it may be set to have a different version valid for each user, for example. In this case, in the user information storage unit 231, instead of the use table type, the ID of the pricing table may be associated for the respective users.

Next, the authentication management unit 222 returns the searched user information, current value, upper limit value, etc. (S105). Included in the user information returned is the ID of the latest version of the pricing table, out of the pricing tables which belong to the applicable use table type. When the user information including the user ID included in the searching request is not found, the authentication management unit 222 returns a response indicating that there is no applicable user information.

Next, the authentication processing unit 125 causes the operation panel 15 to display information indicating success/failure of the login (S105). In other words, if the user information is returned, information indicating the success of the login is displayed. If a response indicating that there is no user information is returned, information indicating the failure of the login is displayed. Steps S106 and beyond are executed if the login is successful.

The authentication processing unit 125 may store the returned user information in the RAM 112, for example, as user information of the login user. Moreover, the authentication processing unit 125 stores the returned current value and upper limit value in the intra-machine upper limit information storage unit 133 in association with the user ID.

FIG. 9 is a diagram illustrating an exemplary configuration of an intra-machine upper limit management table stored in the intra-machine upper limit information storage unit. In FIG. 9, the intra-machine upper limit management table stores the user ID of the login user, the current value, and the upper limit value.

Next, the authentication processing unit 125 and the intra-machine upper limit management unit 124 execute a pricing table synchronization process (S106). The pricing table synchronization process provides for synchronizing information on a pricing table that is stored in the image forming apparatus 10 for the login user with information stored in the authentication charging apparatus 20. As a result, in the image forming apparatus 10, the pricing table for the login user would be the latest.

Next, in response to an operation via the operation panel 15 by the user, the printing control unit 122 causes a list of bibliographic information on print data associated with the user ID of the login user, out of print data stored in the print data storage unit 131 to be displayed on the operation panel 15. Either of the print data sets is selected by the user, and, when the printing request is input (S107), the printing control unit 122 executes a print job on the applicable print data.

FIG. 5 shows that, with respect to printing for each face, a printing process (S108) and an upper limit management process (S109) are executed. For example, for single-sided printing, one sheet of printing corresponds to one face of printing. On the other hand, for double-sided printing, one sheet of printing corresponds to two faces of printing.

In the printing process in step S108, the printing process corresponding to one face is executed by the printing control unit 122. Upon completion of printing corresponding to one face, the printing control unit 122 reports the printing execution event to the intra-machine upper limit management unit 124 and the intra-machine totalization unit 123. The event is aimed at unilateral reporting of information, so that, after reporting the printing execution event, the printing control unit 122 starts a process for the next face without waiting for a response, etc., from the intra-machine upper limit management unit 124. In other words, the process by the printing control unit 122 is executed non-synchronously with the process by the intra-machine upper limit management unit 124 and the intra-machine totalization unit 123. In this way, an increased time required for printing due to the upper limit management function is avoided.

In step S109, in accordance with reporting of the printing execution event, the upper limit management process is executed by the intra-machine upper limit management unit 124. In the upper limit management process, if it is determined that use by a user is to be restricted, the intra-machine upper limit management unit 124 stops the printing process by the printing control unit 122. As a result, the print job is completed. Details of the upper limit management process will be described below. Moreover, in step S109, in response to the reporting of the printing execution event, the intra-machine totalization unit 123 also stores log information on printing which corresponds to one face in the intra-machine log storage unit 132.

When the print job is completed, the intra-machine totalization unit 123 transmits log information on the applicable print job to the authentication charging apparatus 20 via the communication unit 121 (S110). When the log information is received by the communication unit 221, the totalization unit 223 stores the applicable log information in the log storage unit 232.

FIG. 10 is a diagram illustrating an exemplary configuration of a log storage unit. In FIG. 10, the log storage unit 232 stores log information for each print job. The log information includes a log ID, a user ID, a color attribute, a size attribute, the number of faces, the number of sheets printed, etc.

The log ID is identification information for each log information set in units of the print job. The user ID is a user ID for a user related to the print job. The color attribute is a setting value of a color related to the print job. The number of faces is the total number of printing faces which are printed on in the print job. The number of sheets printed is the number of printed sheets output on in the print job.

Next, the totalization unit 223 calculates the cost based on log information newly stored this time (S111). The method of calculating the cost may be the same as the method of calculating the cost in the upper limit management process in step S109. The intra-machine upper limit management unit 124 adds calculation results to the current value stored in the upper limit information storage unit 233 associated with the user ID related to the log information.

Next, when the logout request is input by the user (S112), the authentication processing unit 125 executes the logout process (S113). In the logout process, the image forming apparatus 10 is disabled, for example. For example, if a login screen is displayed on the operation panel 15, an unsuccessful login causes the image forming apparatus 10 to be disabled. Transmission of log information to the authentication charging apparatus 20 may be executed in a logout process. In this way, if multiple jobs are executed, log information on the multiple jobs may be collectively transmitted to the authentication charging apparatus 20.

Figure 11:
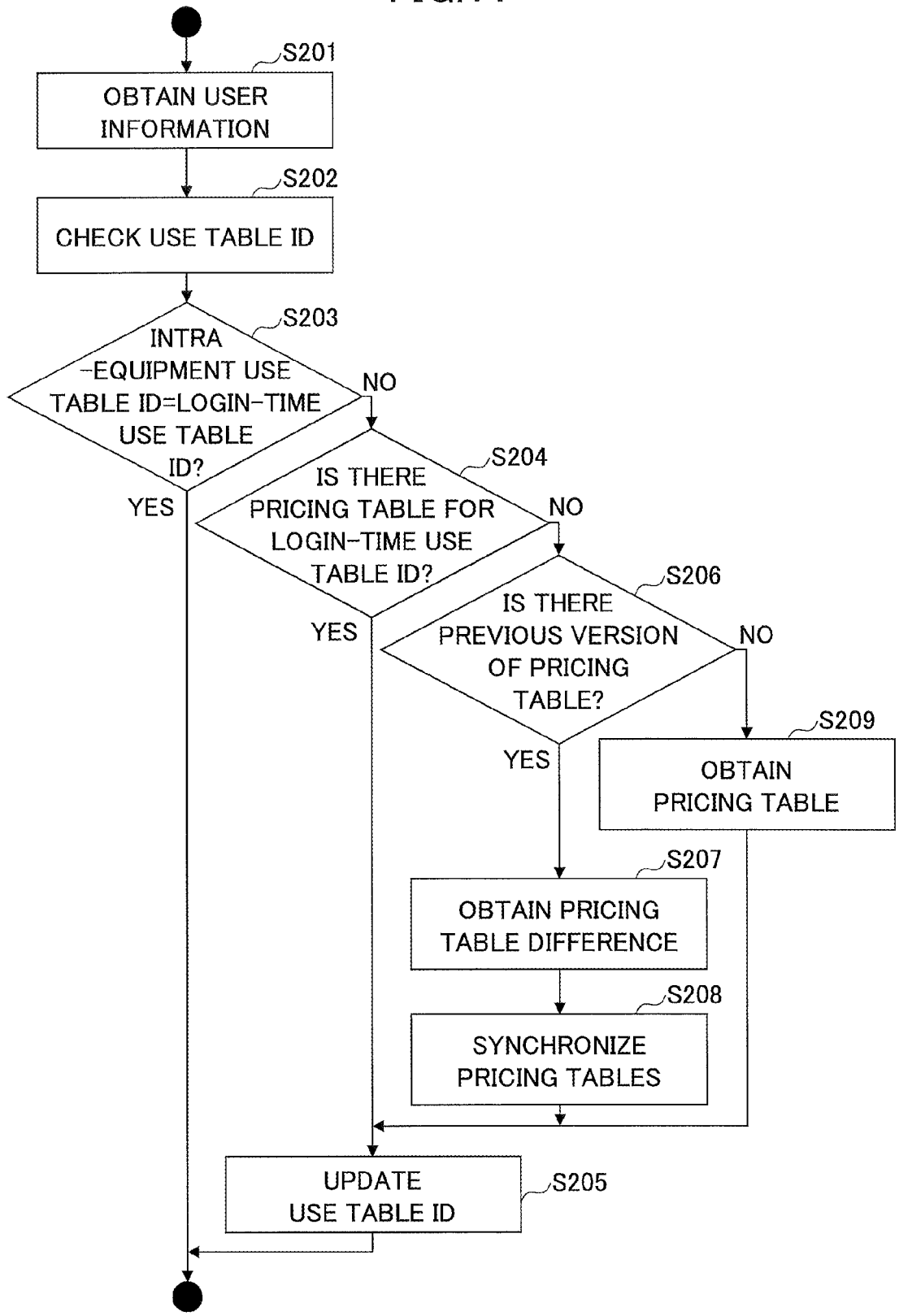
FIG. 11 is a flowchart for explaining one example of a processing procedure of a pricing table synchronization process.

Next, details of step S106 are described. FIG. 11 is a flowchart for explaining one example of a processing procedure of a pricing table synchronization process.

In step S201, the authentication processing unit 125 obtains user information of the login user. The user information of the login user is stored in RAM 112, for example, when user information is received in step S105.

Next, the authentication processing unit 125 compares a use table ID (below-called "a login time use table ID") included in the obtained user information with a use table ID (below-called "intra-machine use table ID") stored in the intra-machine user storage unit 134 in association with the user ID included in the applicable user information (S202).

Figure 12:
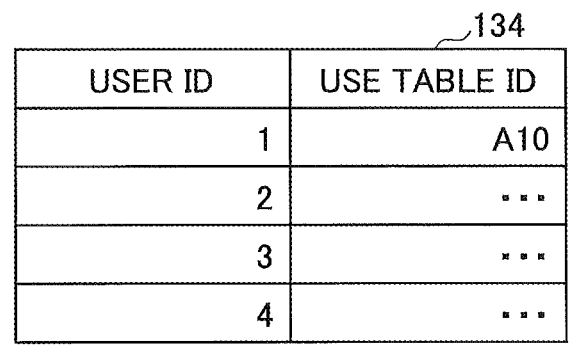

FIG. 12 is a diagram illustrating an exemplary configuration of an intra-machine user storage unit. In FIG. 12, for a user who logged into the image forming apparatus in the past, the intra-machine user storage unit 134 stores a correspondence status between the user ID and the use table ID at the past timing. In other words, in the intra-machine user storage unit 134, in response to a login prior to the previous login that is related to the applicable user ID, an ID for the pricing table obtained from the authentication charging apparatus 20 for the user related to the user ID is stored in association with the user ID.

When there is a match between the intra-machine use table ID and the login time use table ID (YES in S203), the pricing table related to the login time use table ID is stored in the image forming apparatus 10. Therefore, in this case, the process of FIG. 11 is completed without again obtaining the pricing table related to the login time use table ID.

On the other hand, when the intra-machine use table ID and the login time use table ID mutually differ (NO in S203), the intra-machine upper limit management unit 124 determines whether the pricing table corresponding to the login time use table ID is stored in the intra-machine upper limit information storage unit 133 (S204). In other words, it is determined as to whether the pricing table corresponding to the login time use table ID is obtained in response to a login of a different user and stored in the intra-machine upper limit management unit 124.

When the pricing table corresponding to the login time use table ID is stored in the intra-machine upper limit information storage unit 133 (YES in S204), the intra-machine upper limit management unit 124 updates the value of the use table ID for the user ID of the login user (in other words, an intra-machine use table ID) to the login time use table ID in the intra-machine user storage unit 134.

For example, when the intra-machine use table ID is "A10", the login time use table ID is "A11", and the pricing table corresponding to "A11" is stored in the intra-machine upper limit information storage unit 133, the intra-machine use table ID is updated to "A11".

On the other hand, when the pricing table corresponding to the login time use table ID is not stored in the intra-machine upper limit information storage unit 133 (NO in S204), the intra-machine upper limit management unit 124 determines whether the previous version of the pricing table related to the login time use table ID is stored in the intra-machine upper limit information storage unit 133 (S206). In other words, it is determined as to whether there is a pricing table with the same type as the pricing table related to the login time use table ID and with a version number smaller than the version number included in the login time use table ID. For example, the ID of a version immediately before "A11" is "A10". When the same type of pricing table does not exist, the search condition may be relaxed. For example, it may be determined as to whether any pricing table regardless of the type is stored in the intra-machine upper limit information storage unit 133.

When there is a pricing table applicable (YES in S206), the intra-machine upper limit management unit 124 obtains from the authentication charging apparatus 20 difference information on the pricing table related to the login time use table ID with respect to the applicable pricing table (S207). More specifically, the intra-machine upper limit management unit 124 transmits, to the authentication charging apparatus 20 via the communication unit 121, a request for obtaining the difference information including an ID of the pricing table (called "a reference use table" ID below). When the applicable obtaining request is received by the communication unit 221, the upper limit information management unit 224 extracts the difference information of the pricing table related to the login time use table ID with respect to the pricing table related to the reference use table ID included in the obtaining request. In the authentication charging apparatus 20, a known session management may be performed with respect to communication with the image forming apparatus 10, for example. In this case, the login time use table ID may be specified based on session information related to the request for obtaining the difference information. Alternatively, the login time use table ID or the user ID of the login user may be included in the request for obtaining the difference information.

According to the example in FIG. 8, when the reference use table ID is "A10" and the login time use table ID is "A11", the pricing table related to "A11" differs from the pricing table related to "A10" in that the value of black and white for a Copy function is "15", while the value of A3 for the Copy function is "11". Therefore, information such as below is extracted as difference information.

$c.fc=15, c.a3=11$

The applicable difference information includes a description in the form of [Functional identifier].[Attribute identifier]=[Value] for each point of difference. The Functional identifier is a symbol shown within the parentheses for each functional column of the pricing table. In the example in FIG. 8, "c" indicates Copy, while "p" indicates Print. The Attribute identifier is a symbol shown within the parentheses for each attribute row of the pricing table. In the example in FIG. 8, "fc" indicates color, while "a3" indicates A3. The [Value] is a value of a pricing table related to the login time use table ID at the point of difference. The form of difference information is not limited to the above. For example, the difference in Value of the two pricing tables at the point of difference may be set to [Value].

The upper limit information management unit 224 returns extracted differential information to the image forming apparatus 10 via the communication unit 221. When the difference information is received by the communication unit 121, the intra-machine upper limit management unit 124 causes the pricing table stored in the intra-machine upper limit information storage unit 133 to be synchronized with the pricing table stored in the upper limit information storage unit 233 based on the received difference information (S208). For example, the ID of the pricing table related to the reference use table ID that is stored in the intra-machine upper limit information storage unit 133 may be updated to the login time use table ID, so that the difference information may be applied to the pricing table. Alternatively, a duplicate of the pricing table related to the reference use table ID may be produced, the ID of the duplicate may be updated to the login time use table ID, and the difference information may be applied to the duplicate. In the latter, a new pricing table is produced, leading to an advantage that a pricing table related to the reference use table ID may be held.

Next, the intra-machine upper limit management unit 124 updates the value of the use table ID for the user ID of the login user (in other words, the intra-machine use table ID) to the login time use table ID in the intra-machine user storage unit 134 (S205).

Moreover, in step S206, when there is no applicable pricing table (NO in S206), the intra-machine upper limit management unit 124 obtains (downloads), from the authentication charging apparatus 20, the pricing table related to the login time use table ID via the communication unit 121 (S209). The downloaded pricing table is stored in the intra-machine upper limit information storage unit 133. Next, the intra-machine upper limit management unit 124 updates the value of the use table ID for the user ID of the login user (in other words, the intra-machine use table ID) to the login time use table ID in the intra-machine user storage unit 134 (S205).

As described above, for the pricing table synchronization process, first a comparison of the intra-machine table ID and the login time use table ID is performed, and, if they differ, difference information is obtained to perform synchronization of the pricing tables. In this way, redundancy of information exchanged between the image forming apparatus 10 and the authentication charging apparatus 20 may be reduced and a likelihood of being able to reduce communication time and communication load may be increased.

Figure 13:
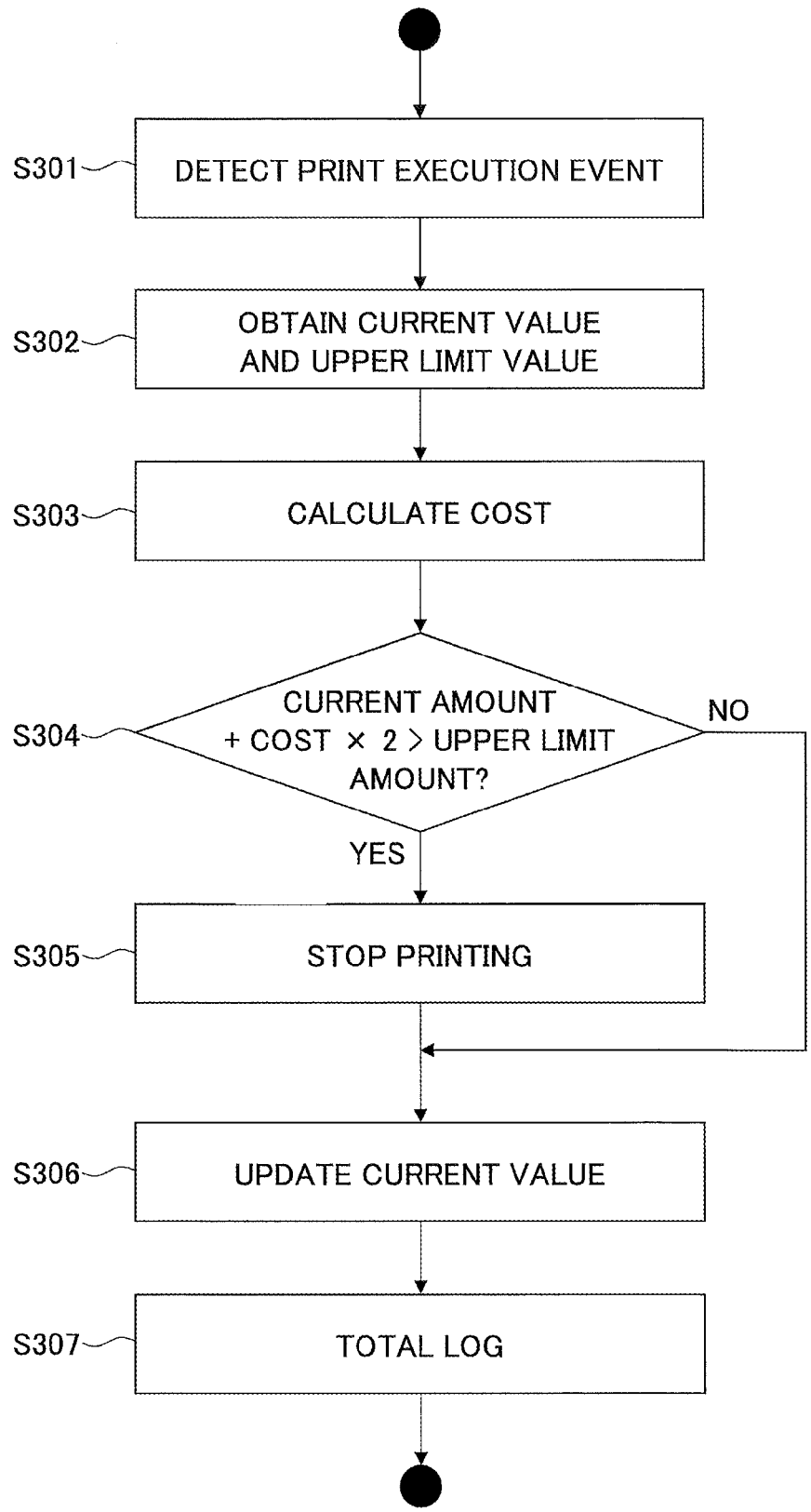
FIG. 13 is a flowchart for explaining one example of a processing procedure of an upper limit management process.

Next, details of step S109 in FIG. 5 are described. FIG. 13 is a flowchart for explaining one example of a processing procedure of an upper limit management process.

In step S301, the intra-machine upper limit management unit 124 detects a printing execution event issued by the printing control unit 122. The printing execution event includes a user ID related to the print job, a color attribute, a size attribute, the number of faces, etc., that make up log information. In the present embodiment, the printing execution event is issued for each face, so that the number of faces does not have to be included in the printing execution event. Moreover, information indicating a department to which the user ID belongs and information on other setting information such as stapling, punching, etc., may also be included.

Next, the intra-machine upper limit management unit 124 obtains the current value and the upper limit value that are associated with the user ID included in the printing execution event from the intra-machine upper limit management table of the intra-machine upper limit information storage unit 133 (S302). Next, the intra-machine upper limit management unit 124 calculates the cost of printing corresponding to one face that is related to the printing execution event (S303).

For example, suppose that the values of the color attribute and the size attribute that are included in the printing execution event are respectively "color" and "A4". In this case, according to the pricing table whose ID is "A11" (FIG. 8), the value below is calculated as Cost.

Cost=15+5=20

Next, the intra-machine upper limit management unit 124 determines whether the condition below is satisfied (S304):

Current value+Cost×2>upper limit value   (1)

The above-described condition (1) is for determining whether a face immediately subsequent to the immediately-subsequent face can be printed. The upper limit management process is executed non-synchronously with the printing process (S108), so that, during the process in FIG. 13, printing related to a face immediately subsequent to the face for the printing execution event related to the process is executed. Then, whether the immediately-subsequent face can be printed may be determined to suppress an occurrence of a situation causing printing which exceeds an upper limit value to be permitted.

For example, when the user ID is user 1, which is "1", the current value is 1980 and the upper-limit value is 2000 with reference to FIG. 7. Moreover, if the cost value is 21 as described above, the condition (1) would be satisfied as shown below:

1980+20×2=2020>2000

When the condition (1) is satisfied (YES in S304), the intra-machine upper limit management unit 124 reports a stop instruction to the printing control unit 122 (S305). In response to the reporting of the stop instruction, the printing control unit 122 causes the print job to be stopped. Printing of a face at the time the stop instruction is received may be completed. This is because whether a face immediately subsequent to the immediately-subsequent face can be printed is determined as described above, so that what to be printed at the time of the stop instruction may be the immediately-subsequent face.

Next, based on the cost calculated in step S303, the intra-machine upper limit management unit 124 updates the current value stored in the intra-machine upper limit management table in association with the user ID included in the printing execution event (S306). In other words, the cost is added to the current value. For example, when the login user is user 1, the current value is updated as follows:

Current value=1980+20=2000

When the condition (1) is not satisfied, the print job is not stopped, so that step S306 is executed.

Next, the intra-machine totalization unit 123 totalizes log information sets related to the applicable print job (S307). More specifically, when there is no record in the intra-machine log storage unit 132 that has stored therein log information related to the applicable print job, a record for storing the applicable log information is generated in the intra-machine log storage unit 132. The configuration of the intra-machine log storage unit 132 is the same as what is shown in FIG. 10. Here, for the user ID, the color attribute, and the size attribute of the applicable record, a value included in the printing execution event is transcribed. The log ID is newly assigned by the intra-machine totalization unit 123. The intra-machine totalization unit 123 stores the applicable log ID until the completion of the print job, and, based on the applicable log ID, determines as to whether there is a record in which is stored the log information related to the applicable print job. When there is such a record, 1 is added to the number of faces for the applicable record. Moreover, if the print job is completed, a value is stored into the record for the number of sheets printed. Step S307 may be executed in parallel with steps S301-S306.

As described above, according to the present embodiment, calculation of cost and comparison of the current value and the upper limit value are executed by the image forming apparatus 10. Therefore, the instantaneity of the upper limit management function may be increased relative to when these processes are executed by the authentication charging apparatus 20. However, in this case, the image forming apparatus 10 needs to obtain a pricing table. According to the present embodiment, the pricing table stores a total of 6×2=12 types of parameters for 6 types of attributes and 2 types of functions. However, in order to calculate the cost more precisely, parameters related to more attributes and functions may be stored in the pricing table. In this case, parameters related to at least several hundred types of attributes may be stored in the pricing table. Moreover, in a large company, one authentication charging apparatus 20 could be assigned to at least several hundred image forming apparatuses 10. The communication burden on the pricing table by the authentication charging apparatus 20 with respect to the upper limit management function in the image forming apparatus 10 to which a real-time property is highly demanded in such a situation becomes unnegligibly large.

Then, according to the present embodiment, when the pricing table corresponding to the login user is not stored in the intra-machine upper limit information storage unit 133, information on the difference with the pricing table stored in the intra-machine upper limit information storage unit 133 is obtained from the authentication charging apparatus 20. As a result, an amount of increase in the communication burden for distributing, to the image forming apparatus 10, a pricing table which is a set of parameters for calculating the use cost of the image forming apparatus 10 may be suppressed.

Moreover, according to the present embodiment, the use cost of the image forming apparatus 10 is calculated in both the image forming apparatus 10 and the authentication charging apparatus 20. In other words, the authentication charging apparatus 20 calculates the cost on its own based on log information transmitted from the image forming apparatus 10. Such a feature makes it possible to update the current value for the login user based on a new pricing table on the authentication charging apparatus 20 side if a version upgrade of the pricing table is executed during execution of the print job, for example. Moreover, a pricing table corresponding to the respective candidate image forming apparatuses 10 to be replaced to in considering replacement, etc., of the image forming apparatus 10 may be provided to calculate the cost for the respective candidate apparatuses based on the log information stored in the log information storage unit. As a result, in a use mode of the image forming apparatus 10 in an environment in which the printing system 1 is installed, the image forming apparatus 10 which is more cost advantageous may be selected as what is to be replaced.

While an example in which the upper limit value and the current value are managed for each user has been shown according to the present embodiment, one upper limit value and one present value may be applied to multiple users.

Moreover, the present embodiment may be applied for a function other than the printing function, or may be applied for use of an equipment unit other than the image forming apparatus 10. For example, the present embodiment may be applied for use of a projector, a teleconferencing system, an electronic whiteboard, etc.

In the present embodiment, the authentication processing unit 125 is one example of a first obtaining unit and a comparison unit. The intra-machine upper limit management unit 124 is one example of a second obtaining unit and a control unit.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device. As described above, the embodiments of the present invention have been described in detail.

However, the present invention is not limited to such specific embodiment, so that variations and modifications are possible within the scope of the gist of the present invention that is recited in the claims.

The present application is based on and claims the benefit of priority of Japanese Priority Application No. 2014-027112 filed on Feb. 17, 2014, the entire contents of which is hereby incorporated by reference.

The invention claimed is:

1. A method, comprising:
   receiving, via a processor of an image forming apparatus, a request from a user to use the image forming apparatus and retrieving, from a network connected apparatus, identification information corresponding to the user;
   determining whether or not the received identification information, via the processor, is stored in a memory of the image forming apparatus;
   obtaining via the processor, upon the processor determining that the identification information is stored in the image forming apparatus, information associated with the identification information;
   requesting information corresponding to the identification information, via the processor, from the network connected apparatus, upon the processor determining that the identification information is not stored in memory of the image forming apparatus; and
   storing in the memory of the image forming apparatus, upon receipt and in association with the identification information, the requested information corresponding to the identification information.

2. The method of claim 1, wherein the information corresponding to the identification information includes pricing information.

3. The method of claim 2, wherein upon pricing information, different from the pricing information stored in the memory in association with the identification information, being associated with the identification information in the network connected apparatus, receiving and storing the different pricing information in the memory of the image forming apparatus, in association with the identification information.

4. The method of claim 1, wherein upon information, different from the information stored in the memory in association with the identification information, being associated with the identification information in the network connected apparatus, receiving and storing the different information in the memory of the image forming apparatus, in association with the identification information.

5. The method of claim 1, wherein the information corresponding to the identification information includes information for calculating a use amount of the image forming apparatus.

6. The method of claim 5, further comprising calculating, via the processor, an amount of use of the image forming apparatus based upon the obtained information for calculating a use amount of the image forming apparatus.

7. The method of claim 6, further comprising controlling, via the processor, use of the image forming apparatus in accordance with the calculated amount of use.

8. An image forming apparatus, comprising:
a memory; and
a processor, configured
- to receive a request from a user to use an image forming apparatus and to retrieve, from a network connected apparatus, identification information corresponding to the user;
- to determine whether or not identification information, corresponding to a user of the image forming apparatus, is stored in the memory of the image forming apparatus,
- to obtain, upon determining that the identification information is stored in the memory, information corresponding to the identification information, and
- to request from the network connected apparatus, upon determining that the identification information is not stored in the memory, information corresponding to the identification information, the memory being configured to store the requested information corresponding to the identification information, upon receipt and in association with the identification information.

9. The image forming apparatus of claim 8, wherein the information corresponding to the identification information is pricing information.

10. The image forming apparatus of claim 9, wherein upon pricing information, different from the pricing information stored in the memory in association with the identification information, being associated with the identification information in the network connected apparatus, the processor being configured to receive and store the different pricing information in the memory of the image forming apparatus, in association with the identification information.

11. The image forming apparatus of claim 8, wherein upon information, different from the information stored in the memory in association with the identification information, being associated with the identification information in the network connected apparatus, the processor being configured to receive and store the different information in the memory of the image forming apparatus, in association with the identification information.

12. The image forming apparatus of claim 8, wherein the information corresponding to the identification information is information for calculating a use amount of the image forming apparatus.

13. The image forming apparatus of claim 12, wherein the processor is further configured to calculate an amount of use of the image forming apparatus based upon the obtained information for calculating a use amount of the image forming apparatus.

14. The image forming apparatus of claim 13, wherein the processor is further configured to control use of the image forming apparatus in accordance with the calculated amount of use.

15. An information processing system, comprising:
an image forming apparatus, including
a memory, and
a processor, configured
- to receive a request from a user to use an image forming apparatus and to retrieve, from a network connected apparatus, identification information corresponding to the user;
- to determine whether or not identification information, corresponding to a user of the image forming apparatus, is stored in the memory of the image forming apparatus,
- to obtain, upon determining that the identification information is stored in the memory, information corresponding to the identification information, and
- to request from the network connected apparatus, upon determining that the identification information is not stored in the memory, information corresponding to the identification information, the memory being configured to store the requested information corresponding to the identification information, upon receipt and in association with the identification information; and an information processing apparatus, as the network connected apparatus, connected to the image forming apparatus via a network.

16. The information processing system of claim 15, wherein the information corresponding to the identification information is pricing information.

17. The information processing system of claim 16, wherein upon pricing information, different from the pricing information stored in the memory in association with the identification information, being associated with the identification information in the network connected information processing apparatus, the processor being configured to receive and store the different pricing information in the memory of the image forming apparatus, in association with the identification information.

18. The information processing system of claim 15, wherein the information corresponding to the identification information is information for calculating a use amount of the image forming apparatus.

19. The information processing system of claim 18, wherein the processor is further configured to calculate an amount of use of the image forming apparatus based upon the obtained information for calculating a use amount of the image forming apparatus.

20. The information processing system of claim 19, wherein the processor is further configured to control use of the image forming apparatus in accordance with the calculated amount of use.

* * * * *